United States Patent
Shibata

(10) Patent No.: US 11,503,346 B2
(45) Date of Patent: Nov. 15, 2022

(54) SYSTEM, METHOD, AND COMPUTER-READABLE MEDIUM INCLUDING PROGRAM FOR DISTRIBUTING LIVE VIDEO

(71) Applicant: DeNA Co., Ltd., Tokyo (JP)

(72) Inventor: Kazuto Shibata, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 17/067,067

(22) Filed: Oct. 9, 2020

(65) Prior Publication Data

US 2021/0112286 A1    Apr. 15, 2021

(30) Foreign Application Priority Data

Oct. 15, 2019  (JP) .............................. JP2019-188968

(51) Int. Cl.
*H04N 21/2187* (2011.01)
*H04N 21/24* (2011.01)
(Continued)

(52) U.S. Cl.
CPC ..... *H04N 21/2187* (2013.01); *H04N 21/2407* (2013.01); *H04N 21/25891* (2013.01);
(Continued)

(58) Field of Classification Search
CPC ........... H04N 21/2187; H04N 21/2407; H04N 21/26233; H04N 21/44204;
(Continued)

(56) References Cited

U.S. PATENT DOCUMENTS

| | | | |
|---|---|---|---|
| 10,038,929 B1 * | 7/2018 | Thomas | ............... H04N 21/458 |
| 2013/0247120 A1 * | 9/2013 | Milgramm | ......... H04N 21/4882 |
| | | | 725/110 |
| 2016/0014461 A1 * | 1/2016 | Leech | ................ H04N 21/4312 |
| | | | 725/14 |

FOREIGN PATENT DOCUMENTS

| | | |
|---|---|---|
| JP | 2001306478 A | 11/2001 |
| JP | 2019022219 A | 2/2019 |
| JP | 6526898 B1 | 6/2019 |

OTHER PUBLICATIONS

Notice of Reasons for Refusal issued in corresponding Japanese Patent Application No. 2019-188968, dated Feb. 7, 2020, with translation (7 pages).

(Continued)

*Primary Examiner* — Nnenna N Ekpo
(74) *Attorney, Agent, or Firm* — Osha Bergman Watanabe & Burton LLP

(57) ABSTRACT

A video distribution server according to one embodiment of the present invention promotes viewing of live video by a new viewer. The server provides a user with a live video distribution service for distributing and viewing live video via a user terminal communicably connected via a communication network. The server distributes live video provided by a specific distributor such that a viewer having a small value of a predetermined parameter corresponding to the specific distributor is prioritized, and thus a new viewer is prioritized over a regular viewer of the live video provided by the specific distributor. As a result, viewing of the live video by the new viewer is promoted.

10 Claims, 16 Drawing Sheets

(51) Int. Cl.
*H04N 21/658* (2011.01)
*H04N 21/442* (2011.01)
*H04N 21/2743* (2011.01)
*H04N 21/258* (2011.01)
*H04N 21/475* (2011.01)
*H04N 21/266* (2011.01)

(52) U.S. Cl.
CPC ....... *H04N 21/266* (2013.01); *H04N 21/2743* (2013.01); *H04N 21/44204* (2013.01); *H04N 21/6582* (2013.01); *H04N 21/4756* (2013.01)

(58) Field of Classification Search
CPC ......... H04N 21/8355; H04N 21/25891; H04N 21/266; H04N 21/6582
See application file for complete search history.

(56) References Cited

OTHER PUBLICATIONS

Shima, et al., "Nico Nico Live Broadcasting Pocket Guide," Mainichi Communications Co., Ltd., Nov. 15, 2010, First Edition, p. 24, 66, 71, 79-80, 88 (12 pages).

* cited by examiner

USER INFORMATION TABLE 411

| USER ACCOUNT |
|---|
| BASIC INFORMATION |
| DISTRIBUTION HISTORY INFORMATION |
| VIEWING HISTORY INFORMATION |
| FOLLOWING USER INFORMATION |
| FOLLOWER INFORMATION |
| RANKING |
| RANKING METER VALUE |
| NUMBER OF HELD COINS |
| NUMBER OF HELD DIAMONDS |
| ... |

FIG. 3

| RANKING BAND | S | | | A | | | B | | | C | | | D | | | E |
|---|---|---|---|---|---|---|---|---|---|---|---|---|---|---|---|---|
| RANKING | S+ | S | S- | A+ | A | A- | B+ | B | B- | C+ | C | C- | D+ | D | D- | E |

FIG. 4

DISTRIBUTION MANAGEMENT TABLE 412

| |
|---|
| DISTRIBUTION ID |
| DISTRIBUTOR USER ACCOUNT |
| DISTRIBUTION DATE AND TIME |
| DISTRIBUTION DURATION |
| NUMBER OF VIEWERS (CURRENT VALUE AND MAXIMUM VALUE) |
| NUMBER OF COMMENTS |
| NUMBER OF LIKES |
| ITEM POINT |
| DISTRIBUTION POINT |
| INCOGNITO DISTRIBUTION MODE FLAG |
| ... |

FIG. 5

DISTRIBUTOR-SPECIFIC VIEWING MANAGEMENT TABLE 413

| |
|---|
| VIEWER USER ACCOUNT |
| DISTRIBUTOR USER ACCOUNT |
| TARGET PERIOD VIEWING TIME |
| INCOGNITO DISTRIBUTION VIEWING RESTRICTION FLAG |
| ... |

FIG. 6

| RATING OF DISTRIBUTION POINT WITHIN RANKING BAND ON PREVIOUS DAY | FLUCTUATION IN RANKING METER VALUE |
|---|---|
| TOP 10% | +2 |
| TOP 11 TO 30% (REMAINING 20% AFTER SUBTRACTING TOP 10% FROM TOP 30%) | +1 |
| MIDDLE 30% | ±0 |
| BOTTOM 40% | −1 |
| *NO DISTRIBUTION THAT DAY | −1 |

FIG. 15

| UPDATE CONTENT OF RANKING | NECESSARY RANKING METER VALUE |
|---|---|
| INCREASE IN RANKING TO ANOTHER RANKING BAND | +4 |
| INCREASE IN RANKING WITHIN SAME RANKING BAND | +2 |
| DECREASE IN RANKING WITHIN SAME RANKING BAND | -2 |
| DECREASE IN RANKING TO ANOTHER RANKING BAND | -6 |

FIG. 16

SYSTEM, METHOD, AND COMPUTER-READABLE MEDIUM INCLUDING PROGRAM FOR DISTRIBUTING LIVE VIDEO

CROSS-REFERENCE TO RELATED APPLICATIONS

The present application claims the benefit of Japanese Patent Application No. JP2019-188968, filed on Oct. 15, 2019, the content of which is incorporated herein in its entirety by reference.

TECHNICAL FIELD

The present invention relates to a system, a method, and a computer-readable medium including a program for distributing live video.

BACKGROUND ART

A service that enables casual distribution of live video (live distribution, streaming) by various users including a general user has been conventionally provided (for example, see PTL 1 described below). In such a distribution service of live video, a comment and the like by a viewer can be typically input, and communication between a plurality of viewers who are viewing the same live video and a distributor can be achieved through such a comment.

PTL 1: JP 2019-022219A

SUMMARY

In such a distribution service of live video, a viewer referred to as a so-called "regular viewer" who repeatedly views live video provided by a specific distributor (streamer) for a long time sometimes gets excited for long time about comments between regular viewers and exhibits unfriendly speech and behavior toward a new viewer. Such behavior of a regular user may make a new user feel uncomfortable and cause a new user to leave in a short period of time. Particularly, when a user who has just started using the distribution service has an uncomfortable experience during live video viewed in an early stage, motivation to view live video significantly decreases, and as a result, a distributor also loses an opportunity to acquire a new viewer. To solve such a problem, an operating side of a service has been conventionally addressing the problem only in terms of human activity and operation by advising a distributor to ignore a viewer who exhibits undesirable speech and behavior, educating a distributor to give consideration to communication during distribution, and the like.

One object of an embodiment of the present invention is to promote viewing of live video by a new viewer. Other objects of the embodiment of the present invention will be made apparent with reference to the entire description.

A system according to one embodiment of the present invention is a system for distributing live video that includes one or a plurality of computer processors, and the one or plurality of computer processors execute a machine-readable instruction to perform: distributing live video provided by a distributor to a plurality of viewers; and managing a value of a predetermined parameter on a distributor-by-distributor basis of each of the viewers, the predetermined parameter increasing according to viewing of live video provided by a corresponding distributor, and the distribution of live video includes distributing live video provided by a specific distributor such that a viewer having a smaller value of the predetermined parameter corresponding to the specific distributor is prioritized.

A method according to one embodiment of the present invention is a method for distributing live video being executed by one or a plurality of computers, and includes: distributing live video provided by a distributor to a plurality of viewers; and managing a value of a predetermined parameter on a distributor-by-distributor basis of each of the viewers, the predetermined parameter increasing according to viewing of live video provided by a corresponding distributor, and the distribution of live video includes distributing live video provided by a specific distributor such that a viewer having a smaller value of the predetermined parameter corresponding to the specific distributor is prioritized.

A computer-readable medium according to one embodiment of the present invention is a non-transitory computer-readable medium including a program for distributing live video, and the program causes one or a plurality of computers to execute: distributing live video provided by a distributor to a plurality of viewers; and managing a value of a predetermined parameter on a distributor-by-distributor basis of each of the viewers, the predetermined parameter increasing according to viewing of live video provided by a corresponding distributor, and the distribution of live video includes distributing live video provided by a specific distributor such that a viewer having a smaller value of the predetermined parameter corresponding to the specific distributor is prioritized.

Various embodiments of the present invention may promote viewing of live video by a new viewer.

BRIEF DESCRIPTION OF DRAWINGS

FIG. 3 is a diagram illustrating information managed in a user information table 411.

FIG. 4 is a diagram illustrating rankings.

FIG. 5 is a diagram illustrating information managed in a distribution management table 412.

FIG. 6 is a diagram illustrating information managed in a distributor-specific viewing management table 413.

FIG. 15 is a diagram illustrating an update rule for a ranking meter value.

FIG. 16 is a diagram illustrating a correspondence relationship between an update content of a ranking and a necessary ranking meter value.

DETAILED DESCRIPTION

Embodiments of the present invention will be described below with reference to the drawings.

Figure 1:
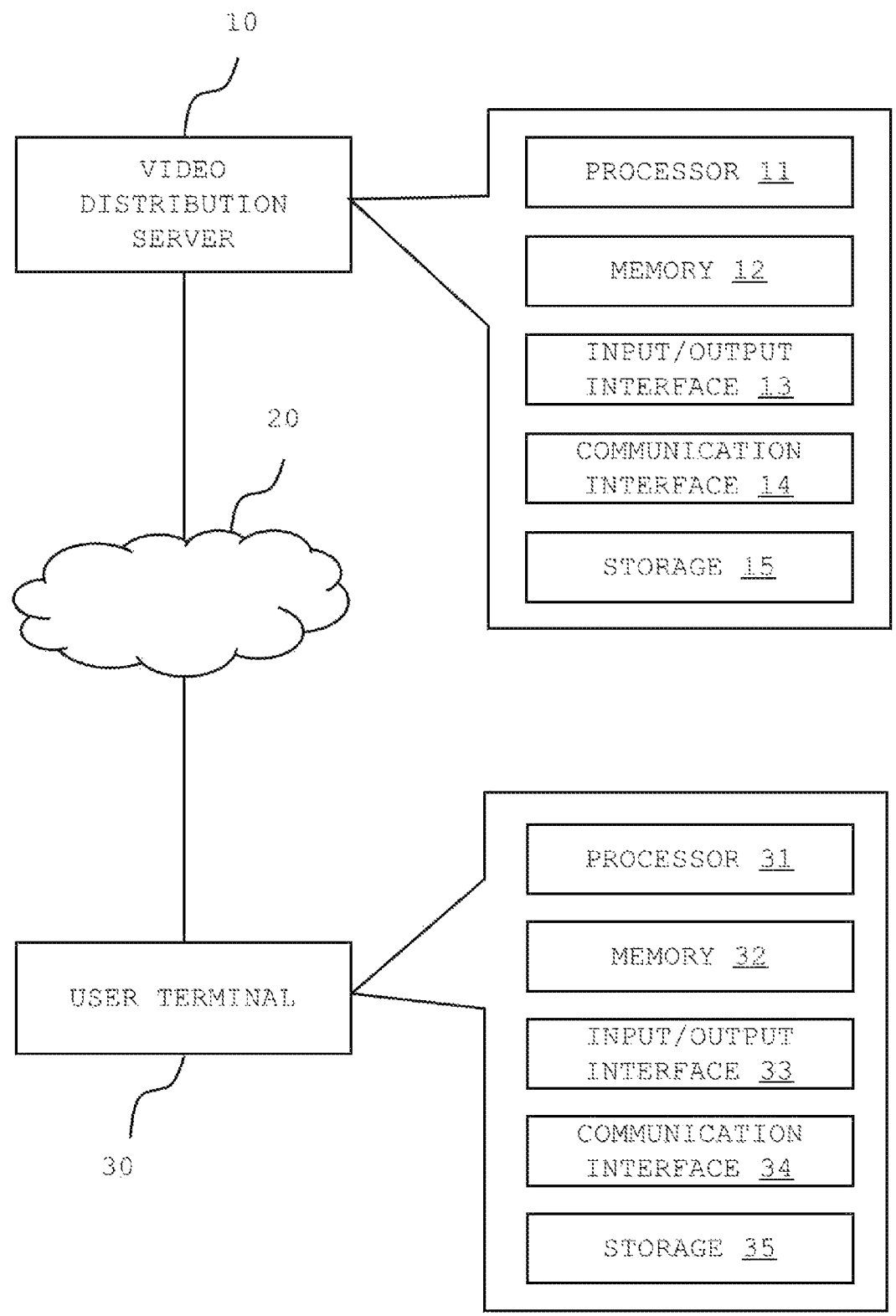
FIG. 1 is a configuration diagram schematically illustrating a configuration of a network including a video distribution server 10 according to an embodiment of the present invention.

FIG. 1 is a configuration diagram schematically illustrating a configuration of a network including a video distribution server 10 according to an embodiment of the present invention. As illustrated, the server 10 is communicably connected to a user terminal 30 via a communication network 20 such as the Internet. Only one user terminal 30 is illustrated in FIG. 1, but the server 10 is communicably connected to a plurality of user terminals 30. The server 10 provides a user with a live video distribution (live streaming) service for distributing and viewing live video via the user terminal 30. In the present embodiment, the user who operates the user terminal 30 can be a distributor (streamer) who distributes live video, and can also be a viewer who views live video provided by another user. The video distribution server 10 is an example of a device in which all or a part of a system of the present disclosure is installed.

The video distribution server 10 is configured as a typical computer and, as illustrated in FIG. 1, the video distribution server 10 includes a computer processor 11, a main memory 12, an input/output interface 13, a communication interface 14, and a storage 15, with these components being electrically connected via a bus (not illustrated) or the like.

The computer processor 11 is configured as a CPU, a GPU, or the like, reads various programs that are stored in the storage 15 or the like into the main memory 12, and executes various kinds of commands (instructions) included in the programs. The main memory 12 is constituted with a DRAM or the like, for example.

The input/output interface 13 includes various kinds of input/output devices for transmitting and receiving information with a user or the like. The input/output interface 13 includes, for example, an information input device such as a keyboard and a pointing device (for example, a mouse, a touch panel, and the like), voice input devices such as a microphone, and an image input device such as a camera. The input/output interface 13 includes an image output device such as a display, and a voice output device such as a speaker.

The communication interface 14 is installed as hardware such as a network adapter, various kinds of communication software, or combinations thereof, and is configured to achieve wired or wireless communication via the communication network 20 or the like.

The storage 15 is constituted with a magnetic disk, a flash memory, or the like, for example. The storage 15 stores various kinds of programs including an operating system, various kinds of data, and the like.

In the present embodiment, the video distribution server 10 can be configured by using a plurality of computers each having the hardware configuration described above. For example, the video distribution server 10 can be constituted with one or a plurality of server devices.

The video distribution server 10 configured in such a manner can be configured to function as a web server and an application server, and, in this case, the video distribution server 10 executes various kinds of processing in response to a request from a web browser and other applications installed on the user terminal 30, and transmits, to the user terminal 30, screen data (such as HTML data), control data, and the like according to a result of the processing. The user terminal 30 can display a web page or another screen, based on the received data.

The user terminal 30 is configured as a typical computer and, as illustrated in FIG. 1, the user terminal 30 includes a computer processor 31, a main memory 32, an input/output interface 33, a communication interface 34, and a storage 35, with these components being electrically connected via a bus (not illustrated) or the like.

The computer processor 31 is configured as a CPU, a GPU, or the like, reads various programs that are stored in the storage 35 or the like into the main memory 32, and executes various kinds of commands included in the programs. The main memory 32 is constituted with a DRAM or the like, for example.

The input/output interface 33 includes various kinds of input/output devices for exchanging information with a user or the like. The input/output interface 33 includes, for example, an information input device such as a keyboard and a pointing device (for example, a mouse, a touch panel, and the like), voice input devices such as a microphone, and an image input device such as a camera. The input/output interface 33 includes an image output device such as a display, and a voice output device such as a speaker.

The communication interface 34 is installed as hardware such as a network adapter, various kinds of communication software, or combinations thereof, and is configured to achieve wired or wireless communication via the communication network 20 or the like.

The storage 35 is constituted with a magnetic disk, a flash memory, or the like, for example. The storage 35 stores various kinds of programs including an operating system, various kinds of data, and the like. The programs stored in the storage 35 can be downloaded from an application market or the like and installed.

In the present embodiment, the user terminal 30 can be configured as a smartphone, a tablet terminal, a personal computer, a wearable device, and the like.

The user who operates the user terminal 30 configured in such a manner can use the live video distribution service provided by the server 10 by executing communication with the video distribution server 10 via a web browser or another application installed in the storage 35 or the like.

Figure 2:
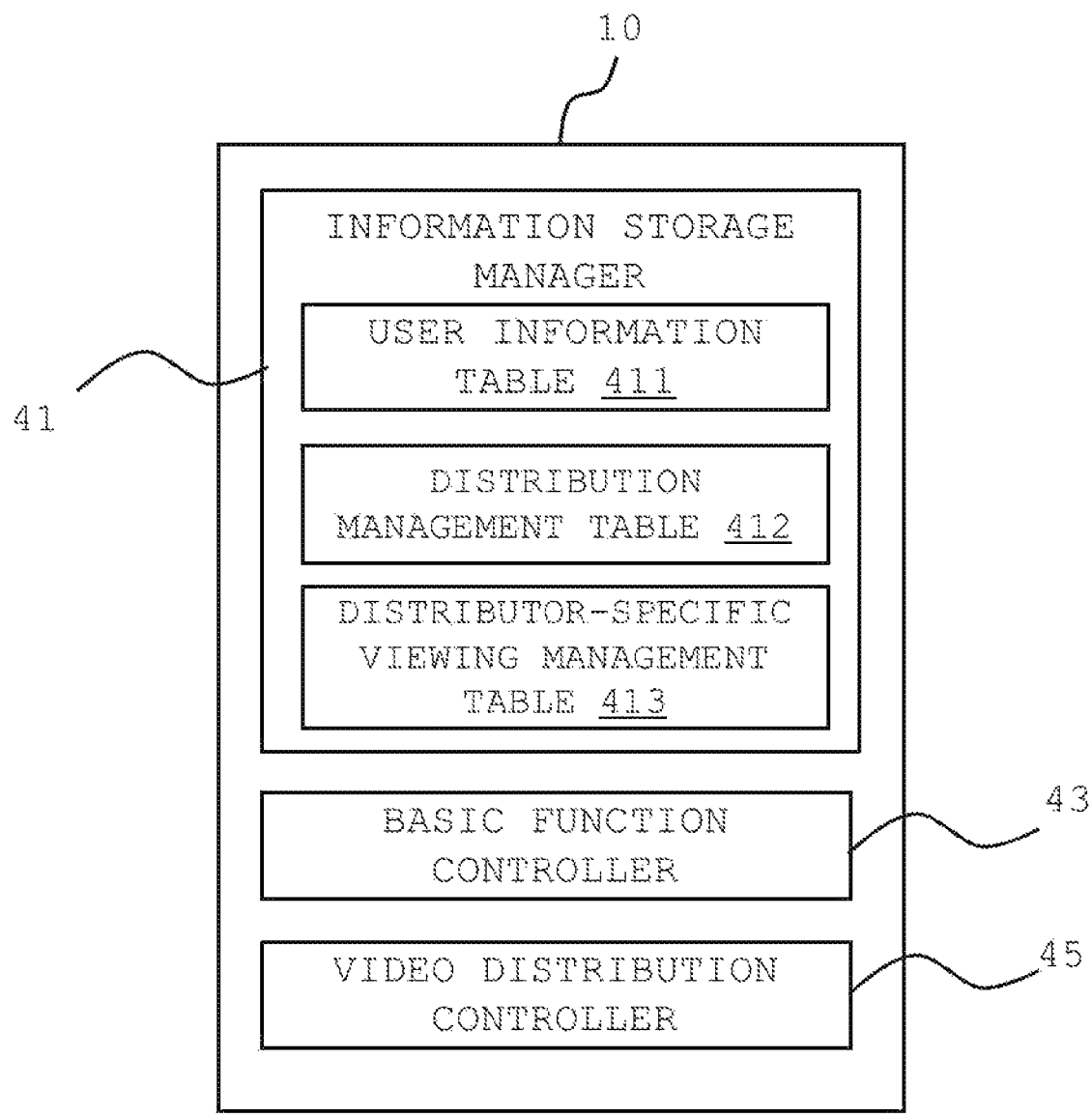
FIG. 2 is a block diagram schematically illustrating functions of the video distribution server 10.

Next, functions of the video distribution server 10 in the present embodiment will be described. FIG. 2 is a block diagram schematically illustrating functions of the server 10. As illustrated, the server 10 includes an information storage manager 41 that stores and manages various kinds of information, a basic function controller 43 that controls basic functions of a live video distribution service, and a video distribution controller 45 that controls distribution of live video. The functions are realized by operating hardware, such as the computer processor 11 and the main memory 12 in cooperation with various kinds of programs, data, and the like (for example, a program for providing a live video distribution service, and the like) stored in the storage 15 and the like. For example, the functions are realized by the computer processor 11 executing a command included in a program read into the main memory 12. Further, some or all of the functions illustrated in FIG. 2 can be realized by operating the server 10 and the user terminal 30 in cooperation, or can be realized by the user terminal 30.

The information storage manager 41 of the video distribution server 10 stores and manages various kinds of information in the storage 15 and the like. For example, as illustrated in FIG. 2, the information storage manager 41 is configured to include a user information table 411 for managing information related to a user of the live video distribution service, a distribution management table 412 for managing information related to distribution of individual live videos, and a distributor-specific viewing management table 413 for managing information related to viewing of live video on a distributor-by-distributor basis by a viewer.

The basic function controller 43 of the video distribution server 10 executes various kinds of processing related to the control of the basic functions of the live video distribution service. For example, the basic function controller 43 transmits screen data, control data, and the like of various kinds of screens related to the basic function to the user terminal 30, executes various kinds of processing in response to an operation input by the user via the screen displayed on the user terminal 30, and transmits the screen data, the control data, and the like according to a result of the processing to the user terminal 30. The basic functions controlled by the basic function controller 43 include, for example, login processing (user authentication), fee charging control, user management (for example, updating of the user information table 411, and the like), and the like.

The video distribution controller 45 of the video distribution server 10 executes various kinds of processing related to the control of distribution of live video. For example, the video distribution controller 45 is configured to distribute live video provided by each of a plurality of distributors to a plurality of viewers. For example, the video distribution controller 45 is configured to receive live video transmitted from the user terminal 30 of a distributor (hereinafter may be referred to as a "distributor terminal 30"), and transmit the live video to the user terminal 30 of each of a plurality of viewers (hereinafter may be referred to as a "viewer terminal 30"). The live video is formed of, for example, an image input through a camera of the distributor terminal 30 and voice input through a microphone of the distributor terminal 30. The distribution of such live video can be performed by, for example, a streaming method using a protocol such as HTTP Live Streaming (HLS).

In the present embodiment, the video distribution controller 45 is configured to manage a value of a predetermined parameter on a distributor-by-distributor basis held by a viewer, and the predetermined parameter increases according to viewing of live video provided by a corresponding distributor. It can also be said that the predetermined parameter is a parameter managed in association with a combination of a viewer and a distributor, and is a parameter increasing according to viewing of live video provided by a corresponding distributor by a corresponding viewer. The predetermined parameter includes, for example, at least one of viewing time and the number of times of viewing, and can be managed in the distributor-specific viewing management table 413. The predetermined parameter can be updated each time viewing of live video ends or at regular intervals.

Further, the video distribution controller 45 is configured to distribute live video provided by a specific distributor such that a viewer having a smaller value of the predetermined parameter corresponding to the specific distributor is prioritized (has higher priority) when the live video is distributed.

In this way, the video distribution server 10 according to the present embodiment distributes live video provided by the specific distributor such that a viewer having a smaller value of a predetermined parameter corresponding to the specific distributor (i.e., a viewer having a smaller number of times of viewing the live video provided by the specific distributor) is prioritized, and thus a new viewer is prioritized over a regular viewer of the live video provided by the specific distributor. As a result, viewing of the live video by the new viewer may be promoted.

In the present embodiment, distribution of live video that prioritizes a viewer having a smaller value of the predetermined parameter described above can be achieved in various aspects. For example, distribution of live video provided by a specific distributor may be limited to a viewer whose value of a predetermined parameter corresponding to the specific distributor is less than a predetermined value. In other words, the video distribution controller 45 can be configured to distribute live video provided by a specific distributor (allow viewing of the live video) to a viewer whose value of a predetermined parameter corresponding to the specific distributor is less than a predetermined value, and, on the other hand, not to distribute the live video provided by the specific distributor (not to allow viewing of the live video. For example, in a list of live videos for selecting a live video to be viewed, the live video provided by the specific distributor is not displayed and/or a predetermined message is displayed without a start of viewing even when the live video provided by the specific distributor is desired to be viewed, and the like) to a viewer whose value of the predetermined parameter corresponding to the specific distributor is equal to or more than the predetermined value. Such a configuration limits a viewer of live video to a viewer having a small number of times of viewing the live video provided by a corresponding distributor, and thus may promote viewing of the live video by a new viewer.

Further, for example, a notification of a start of distribution of live video provided by a specific distributor may be limited to a viewer whose value of a predetermined parameter corresponding to the specific distributor is less than a predetermined value. In other words, the video distribution controller 45 can be configured to notify a start of distribution of live video provided by a specific distributor (for example, perform a push notification/a notification in application, and the like) to a viewer whose value of a predetermined parameter corresponding to the specific distributor is less than a predetermined value, and, on the other hand, not to notify the start of the distribution of the live video provided by the specific distributor to a viewer whose value of the predetermined parameter corresponding to the specific distributor is equal to or more than the predetermined value. In this case, even a viewer whose value of the predetermined parameter is equal to or more than the predetermined value may be allowed to perform viewing itself of the live video, or viewing of the live video may also be limited (may not be allowed). Such a configuration limits a viewer notified of a start of distribution of live video to a viewer having a small number of times of viewing the live video provided by a corresponding distributor, and thus may promote viewing of the live video by a new viewer.

Further, the video distribution controller 45 can be configured to present a list of live videos being distributed to a viewer. For example, the video distribution controller 45 is configured to transmit screen data, control data, and the like of a screen including a list of live videos during distribution to the user terminal 30. In this case, the video distribution controller 45 can be configured to present, to a specific viewer, a list of live videos being distributed by a distributor in which a value of a predetermined parameter of the specific viewer is less than a predetermined value. Such a configuration can present, to a specific viewer, a list of live videos preferentially distributed with the specific viewer as a new viewer, and, as a result, viewing of the live video by the new viewer may be promoted.

Further, the video distribution controller 45 can be configured to start a predetermined mode that prioritizes a viewer having a smaller value of a predetermined parameter according to an instruction by a distributor, and subsequently terminate the predetermined mode according to sufficiency of a predetermined termination condition. Such a configuration terminates preferential distribution of live video to a viewer having a small value of a predetermined parameter according to termination of a predetermined mode, and can thus promote viewing of the live video including a viewer other than a new viewer.

Further, the video distribution controller 45 can be configured to start the predetermined mode described above in response to a start of distribution of live video, and subsequently terminate the predetermined mode according to a lapse of a predetermined period of time. Such a configuration can provide a time limit on distribution of live video preferential to a new viewer.

In the present embodiment, a predetermined termination condition for terminating a predetermined mode can be configured to change according to a distribution situation of live video. For example, the predetermined termination condition can be configured such that the predetermined mode continues for longer time as the number of viewers of the live video increases (for example, such that the condition is more difficult to fulfill) or such that the predetermined mode continues for longer time as the number of inputs of input information (in which a comment, an item, a stamp, and the like may be included) by a viewer of the live video increases. Such a configuration can flexibly continue a predetermined mode according to a distribution situation of live video.

Next, a specific example of the video distribution server 10 in the present embodiment having such a function will be described. In this example, FIG. 3 illustrates information managed in the user information table 411. The user information table 411 manages information related to a user of the live video distribution service and, as illustrated, the user information table 411 manages, in association with "user account" that identifies an individual user, information such as "basic information" including an account name, age, gender, and the like, "distribution history information" that is information related to distribution history of live video, "viewing history information" that is information related to viewing history of live video distributed by another user, "following user information" that is information related to another user followed by the user, "follower information" that is information related to another user (follower) who follows the user, "ranking" that indicates a ranking of a user as a distributor, "ranking meter value" that is a parameter value for determining whether to increase or decrease a ranking, "number of held coins" that indicates how many virtual coins are held in the live video distribution service, and "number of held diamonds" that also indicates how many virtual diamonds are held.

FIG. 4 is a diagram illustrating "ranking" of a distributor in this example. As illustrated, in this example, there are six ranking bands of "S", "A", "B", "C", "D", and "E", and each of the five ranking bands of "S", "A", "B", "C", and "D" is formed of three rankings (for example, a ranking in which "+" is added to a letter indicating a ranking band, a ranking with just the letter, and a ranking in which "−" is added to the letter, such as "S+", "S", and "S−"). The ranking band of "E" is formed of one ranking "E". In other words, in this example, there are 16 levels (3×5+1=16) of rankings.

Further, among the ranking bands, the "S" side is the highest and the "E" side is the lowest. Further, among the rankings in the same ranking band, the "+" side is the highest and the "−" side is the lowest. In this example, a ranking of a user is set to "D−" as an initial value.

In this example, FIG. 5 illustrates information managed in the distribution management table 412. The distribution management table 412 manages information related to distribution of individual live videos, and, as illustrated, the distribution management table 412 manages, in association with "distribution ID" that identifies individual distribution (live video), information such as "distributor user account" that identifies a distributor of the distribution, "distribution date and time", "distribution duration" that indicates a continuous duration of the distribution, "number of viewers (current value and maximum value)", "number of comments" that is the number of comments input by a viewer, "number of likes" that is the number of "likes" input by a viewer, "item point" that increases according to an input of an item by a viewer, "distribution point" that is a point given for the distribution, and "incognito distribution mode flag" that indicates whether the distribution is an incognito (limited, secret) distribution mode (predetermined mode). In this example, as described below in detail, the incognito distribution mode is a distribution mode of live video that can be viewed only by a new viewer.

In this example, FIG. 6 illustrates information managed in the distributor-specific viewing management table 413. The distributor-specific viewing management table 413 manages information related to viewing of live video on a distributor-by-distributor basis by a viewer, and, as illustrated, the distributor-specific viewing management table 413 manages, in association with a combination of "viewer use account" that identifies an individual viewer and "distributor user account" that identifies an individual distributor, information such as "target period viewing time" (predetermined parameter) and "incognito distribution viewing restriction flag" that indicates whether a corresponding viewer is restricted from viewing incognito distribution (live video distributed in an incognito distribution mode) by a corresponding distributor.

In this example, the incognito distribution can be viewed only by a viewer whose total of viewing time in a last month and a current month of live video provided by a corresponding distributor is less than a predetermined value (for example, 5 hours). In other words, a viewer whose total of viewing time in a last month and a current month of live video provided by a corresponding distributor is equal to or more than the predetermined value is restricted from viewing "incognito distribution" by the distributor (cannot view "incognito distribution"). The target period viewing time of the distributor-specific viewing management table 413 manages viewing time in a last month and a current month that are a target period of determination of a viewing limitation on such "incognito distribution", and is appropriately updated according to viewing of live video by a viewer. Then, when a value of the target period viewing time is equal to or more than the predetermined value, a value of "incognito distribution viewing restriction flag" is updated, and a value indicating that viewing of the incognito distribution is restricted is set.

Figure 7:
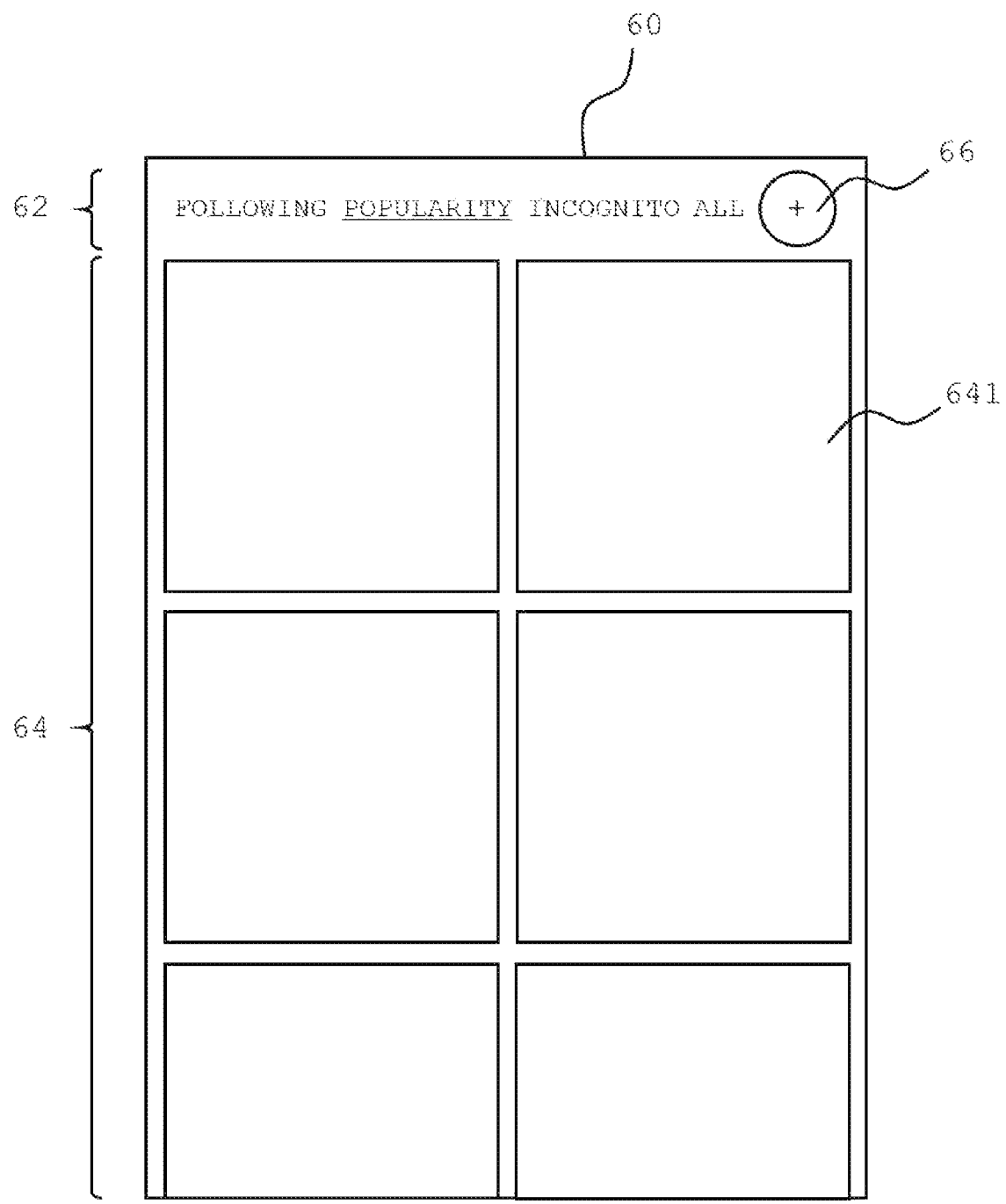
FIG. 7 is a diagram illustrating a top screen 60.

FIG. 7 illustrates a top screen 60 of a live video distribution service displayed on the user terminal 30. The screen 60 is a screen as a start for a user who uses the live video distribution service, and, as illustrated, the screen 60 includes a selection area 62 in which "following", "popular", "incognito", and "all" are displayed, a list display area 64 that is located below the area 62 and displays a list of live videos being distributed, and a distribution button 66 that is located at an upper right corner of the screen and has a circular shape.

The selection area 62 is an area for selecting a display content in the list display area 64. Specifically, when "following" is selected in the selection area 62, a list of live videos being distributed of another user followed by a user is displayed in the list display area 64. Similarly, when "popular" is selected in the selection area 62, a list of live videos (for example, live videos having the number of viewers (current value) equal to or more than a threshold value, and the like) extracted according to a predetermined extraction condition for extracting popular videos is displayed in the list display area 64. Further, when "all" is selected in the selection area 62, all live videos being distributed are targets to be displayed in a list in the list display area 64.

In this example, when "incognito" is selected in the selection area 62, a list of "incognito distribution" that can be viewed by a corresponding user as a viewer is displayed in the list display area 64. The incognito distribution being distributed can be specified by referring to "incognito distribution mode flag" in the distribution management table 412, and "incognito distribution" that can be viewed by a corresponding user as a viewer can also be specified by excluding distribution by a distributor in which the corresponding user is restricted from viewing "incognito distribution" from the incognito distribution being distributed (specified by referring to "incognito distribution viewing restriction flag" in the distributor-specific viewing management table 413).

Further, in this example, even when a selection is made other than "incognito" ("following", "popular", or "all" is selected) in the selection area 62, "incognito distribution" may be included in live video displayed in the list display area 64, but "incognito distribution" by a distributor in which a corresponding user is restricted from viewing "incognito distribution" is excluded. Note that "incognito distribution" may have a higher priority than live distribution other than "incognito distribution" and be displayed (for example, be displayed in an upper side) in the list display area 64 when a selection is made other than "incognito" in the selection area 62.

As illustrated in FIG. 7, in the list display area 64, a plurality of individual display areas 641 each displaying information related to an individual live video are arranged in two columns. The individual display area 641 is configured to display a still image preset by a distributor of live video, an account name of the distributor, a distribution title, the number of viewers (current value), and the like, and play corresponding live video according to a selection by the user. The list display area 64 is configured such that the individual display area 641 to be displayed is switched by a flicking or sliding operation in the up-down direction, and the like.

Figure 8:
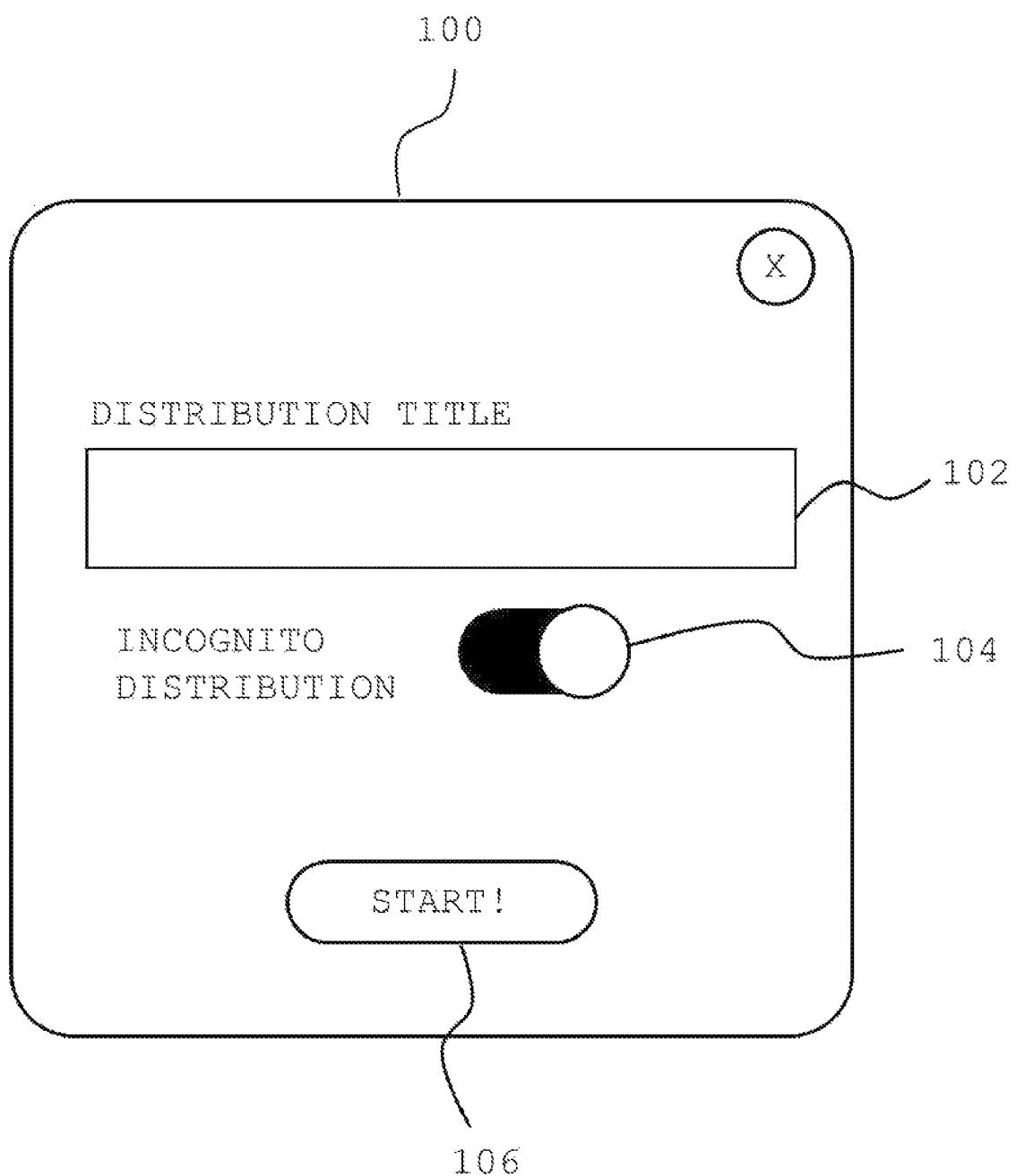
FIG. 8 is a diagram illustrating a distribution preparation screen 100.

The distribution button 66 is an object for the user as a distributor to distribute live video. When the distribution button 66 is selected by the user, a distribution preparation screen 100 illustrated in FIG. 8 is displayed over the top screen 60. As illustrated, the screen 100 includes a distribution title input area 102 for inputting a distribution title, an incognito distribution setting switch 104 for setting an incognito distribution mode, and a distribution start button 106 with "start!" displayed. The incognito distribution setting switch 104 is off (incognito distribution mode is not set) in an initial state. In this way, setting of "incognito distribution mode" by mistake by the distributor is suppressed. Note that a limitation on setting of "incognito distribution mode" by the distributor may be provided, and, for example, a user whose ranking is equal to or more than a predetermined value (for example, "B−" and the like) may be able to set the incognito distribution mode, and, on the other hand, a user whose ranking is less than the predetermined value may not be able to set the incognito distribution mode.

When the distribution start button 106 is selected, distribution of live video starts, and specifically, transmission to the server 10 of video formed of an image input through the camera of the user terminal 30 and voice input through the microphone of the user terminal 30 starts. Further, a new record is created in the distribution management table 412 in response to the start of the distribution of the live video. Further, a notification (such as a push notification and a notification in application) of the start of the distribution is made to a follower of the distributor in response to the start of the distribution of the live video.

Figure 9:
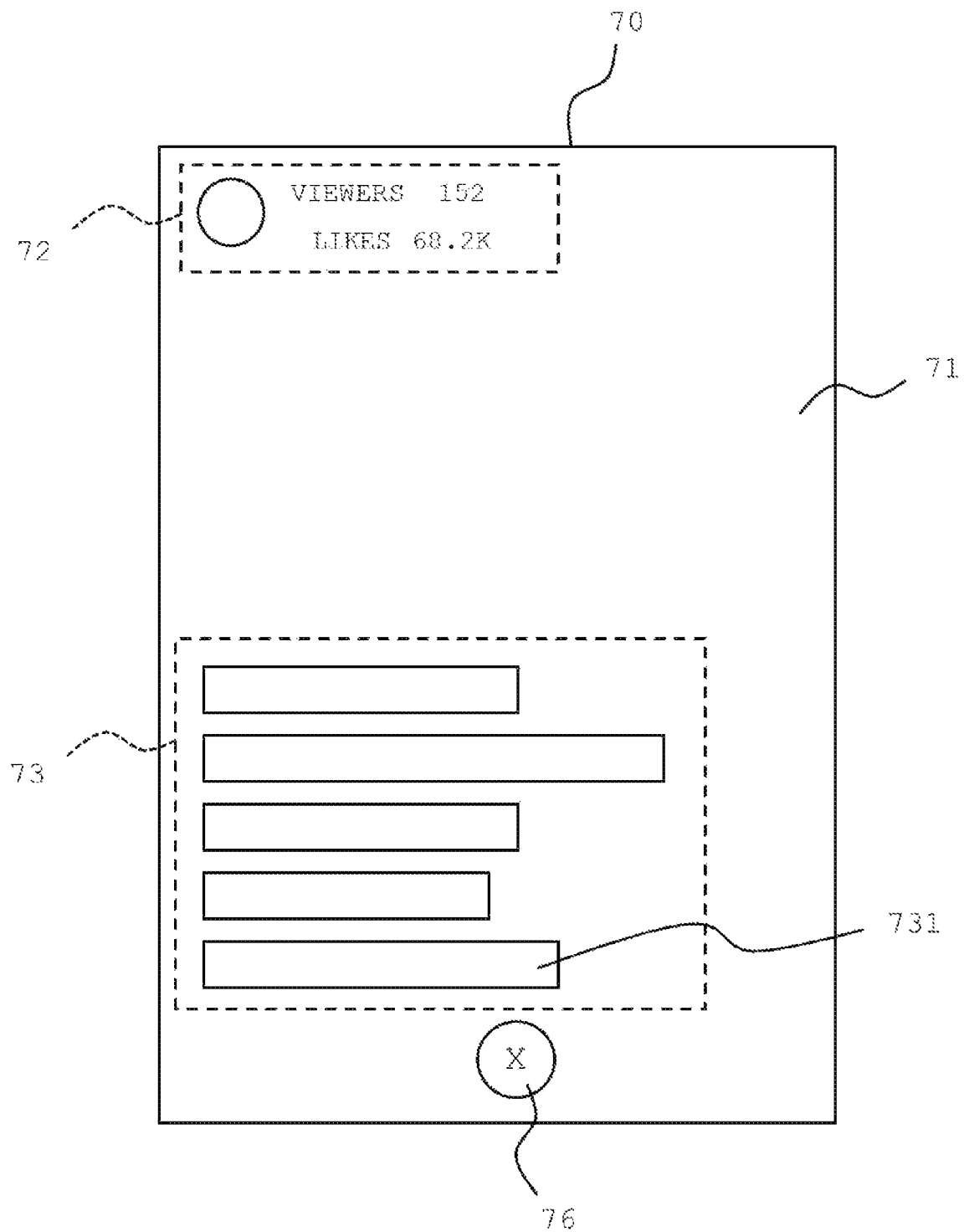
FIG. 9 is a diagram illustrating a distribution screen 70.

FIG. 9 illustrates a distribution screen 70 displayed on the distributor terminal 30 in response to a selection of the distribution start button 106 (i.e., a start of distribution of live video). As illustrated, the screen 70 includes a video display area 71 corresponding to the entire screen, a basic information display area 72 located at an upper left corner of the screen, a comment display area 73 located at the lower left of the screen, and a distribution stop button 76 that is located at the center of a lower end portion of the screen and has a circular shape.

Live video to be distributed, i.e., an image input through the camera of the distributor terminal 30 is displayed in the video display area 71. A distributor normally makes the distributor himself/herself a subject of the video through an in-camera (front camera) of the distributor terminal 30, and thus an image of the distributor himself/herself is included in live video to be distributed.

The basic information display area 72 displays basic information of the distribution, and specifically, displays distributor information (such as a profile image), the number of viewers (current value) of the distribution, the number of "likes" input by a viewer for the distribution, and the like.

The comment display area 73 is an area for displaying a user comment input by a viewer or a system comment being automatically input. Specifically, a plurality of comment objects 731 each corresponding to an individual comment are arranged in the up-down direction in the area 73. The comment display area 73 is configured such that, when a new comment is input, a corresponding comment object 731 is added to the lower side, and an existing comment object 731 sequentially moves upward. The comment display area 73 is configured such that the comment object 731 to be displayed is switched by a flicking or sliding operation in the up-down direction, and the like.

The distribution stop button 76 is an object for the distributor to stop distribution of live video. When the distribution stop button 76 is selected by the distributor, the distribution of the live video (transmission of the live video from the distributor terminal 30 to the server 10) is stopped.

Figure 10:
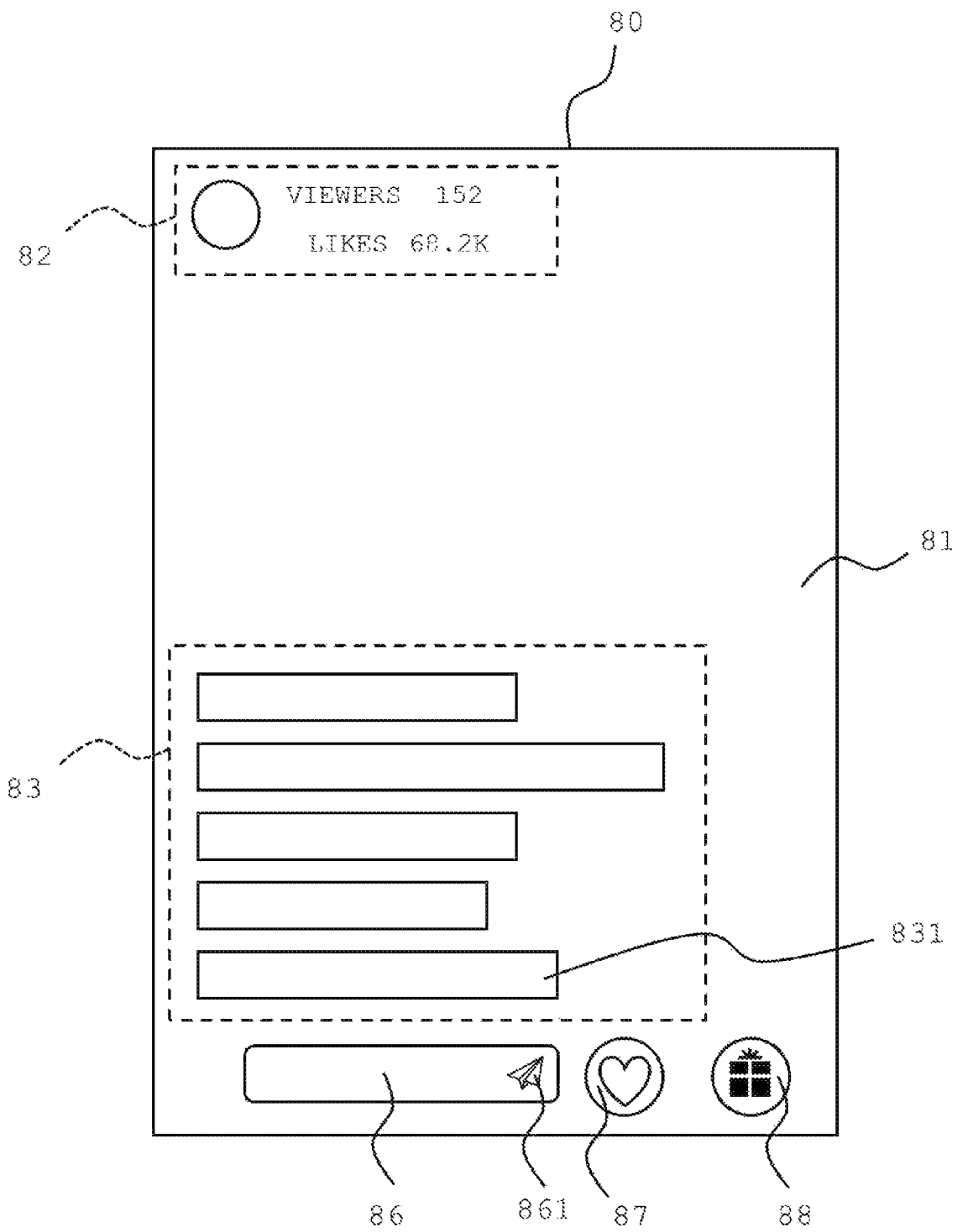
FIG. 10 is a diagram illustrating a viewing screen 80.

FIG. 10 illustrates a viewing screen 80 displayed on the viewer terminal 30. For example, when any live video is selected by a viewer through the list display area 64 of the top screen 60 and the like, the viewing screen 80 for viewing the selected live video is displayed on the viewer terminal 30. As illustrated, the screen 80 includes a video display area 81, a basic information display area 82, and a comment display area 83, similarly to the distribution screen 70 described above. Further, the viewing screen 80 includes, in a lower end portion of the screen, a comment input area 86, a "like" button 87 with a heart mark displayed, and an item input button 88 with a symbol of a gift displayed.

The comment input area 86 is an area for the viewer to input a comment. A transmission object 861 is disposed on a right end portion of the area 86. When the object 861 is selected, a character string input to the comment input area 86 is input as a user comment, and comment input data are transmitted from the viewer terminal 30 to the server 10. The comment input data include a content of the comment and a user account of the viewer who inputs the comment. The server 10 that receives the comment input data transmits the comment input data to a corresponding distributor terminal 30 (the distributor terminal 30 of a distributor of corresponding live video) and each viewer terminal 30 (the viewer terminal 30 of each of a plurality of viewers of the corresponding live video). Further, the server 10 that receives the comment input data updates the number of comments (adds 1) in the distribution management table 412.

In the distributor terminal 30 and each viewer terminal 30 that receive the comment input data from the server 10, the comment object 731 and 831 corresponding to the user comment can be displayed in the comment display areas 73 and 83 of the distribution screen 70 and the viewing screen 80. In the comment objects 731 and 831 corresponding to the user comment, a content of the comment (character string) is displayed together with an account name of the viewer who inputs the comment.

The like button 87 is an object for a viewer to input "like" to a distributor. When the button 87 is selected by a viewer, "like" is input, and like input data are transmitted from the viewer terminal 30 to the server 10. The like input data include a user account of the viewer who inputs "like". The server 10 that receives the like input data transmits the like input data to a corresponding distributor terminal 30 and each viewer terminal 30. Further, the server 10 that receives the like input data updates the "number of likes" (adds 1) in the distribution management table 412.

In the distributor terminal 30 and each viewer terminal 30 that receive the like input data from the server 10, the comment objects 731 and 831 corresponding to a system comment that notifies the input of "like" can be displayed in the comment display areas 73 and 83 of the distribution screen 70 and the viewing screen 80. In the comment objects 731 and 831 corresponding to the system comment, text indicating the input of "like" is displayed together with an account name of the viewer who inputs "like". Further, in the distributor terminal 30 and each viewer terminal 30 that receive the like input data, a predetermined visual effect (for example, an animation effect in which a heart-shaped object is displayed as flowing from a lower side toward an upper side of the screen, and the like) is added in the video display areas 71 and 81 of the distribution screen 70 and the viewing screen 80.

Figure 11:
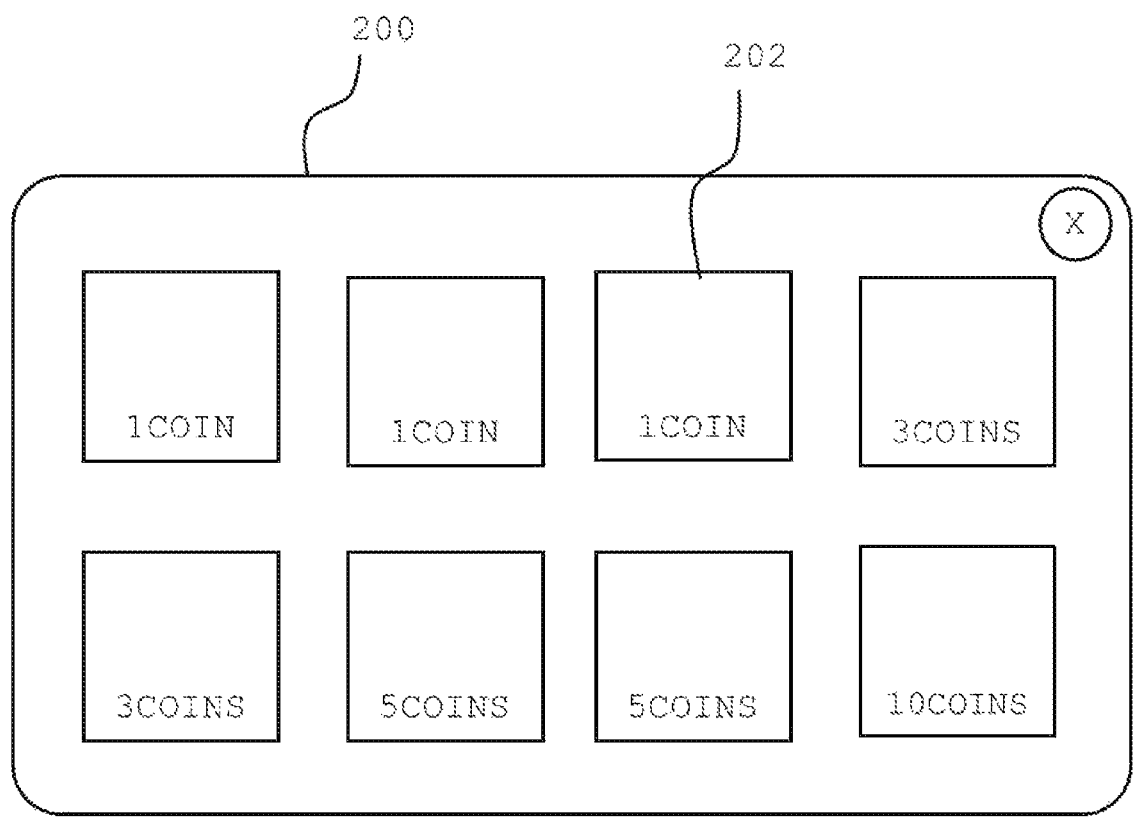
FIG. 11 is a diagram illustrating an item selection screen 200.

The item input button 88 is an object for a viewer to input an item. When the button 88 is selected by a viewer, an item selection screen 200 illustrated in FIG. 11 is displayed over the viewing screen 80. As illustrated, the screen 200 displays a list of a plurality of individual display areas 202 each displaying information related to an item. The individual display area 202 displays an image corresponding to an item and the number of coins required to input the item.

In this example, a plurality of items that can be input by a viewer are predetermined, and the number of coins as a price (value, compensation) of each of the items is preset to the item. The item selection screen 200 displays a list of the plurality of items that can be input. When any of the items is selected by the viewer through the item selection screen 200, the selected item is input.

When the item is input, item input data are transmitted from the viewer terminal 30 to the server 10. The item input data include a user account of the viewer who inputs the item and information that can identify the input item. The server 10 that receives the item input data transmits the item input data to a corresponding distributor terminal 30 and each viewer terminal 30. Further, the server 10 that receives the item input data provides the distribution with an item point according to the number of coins of the input item (for example, a point also increases as the number of coins increases), and specifically, adds the point according to the number of coins to an item point of the corresponding distribution in the distribution management table 412. Further, the server 10 that receives the item input data subtracts the number of coins of the input item from the number of held coins of the corresponding user (the viewer who inputs the item) in the user information table 411.

In the distributor terminal 30 and each viewer terminal 30 that receive the item input data from the server 10, the comment objects 731 and 831 corresponding to a system comment that notifies the input of the item can be displayed in the comment display areas 73 and 83 of the distribution screen 70 and the viewing screen 80. In the comment objects 731 and 831 corresponding to the system comment, a name of the input item is displayed together with an account name of the viewer who inputs the item. Further, in the distributor terminal 30 and each viewer terminal 30 that receive the item input data, a visual effect corresponding to the input item is added in the video display areas 71 and 81 of the distribution screen 70 and the viewing screen 80.

When the distributor selects the distribution stop button 76 on the distribution screen 70, the distribution of the live video ends. When the distribution of the live video ends, the server 10 sets a distribution point for the distribution. In this example, the distribution point is calculated based on the number of viewers (maximum value), the number of likes, the number of comments, and an item point. The distribution point is configured to increase as the number of viewers (maximum value), the number of likes, the number of comments, and an item point increase. The calculated distribution point is registered in the distribution management table 412.

Figure 12:
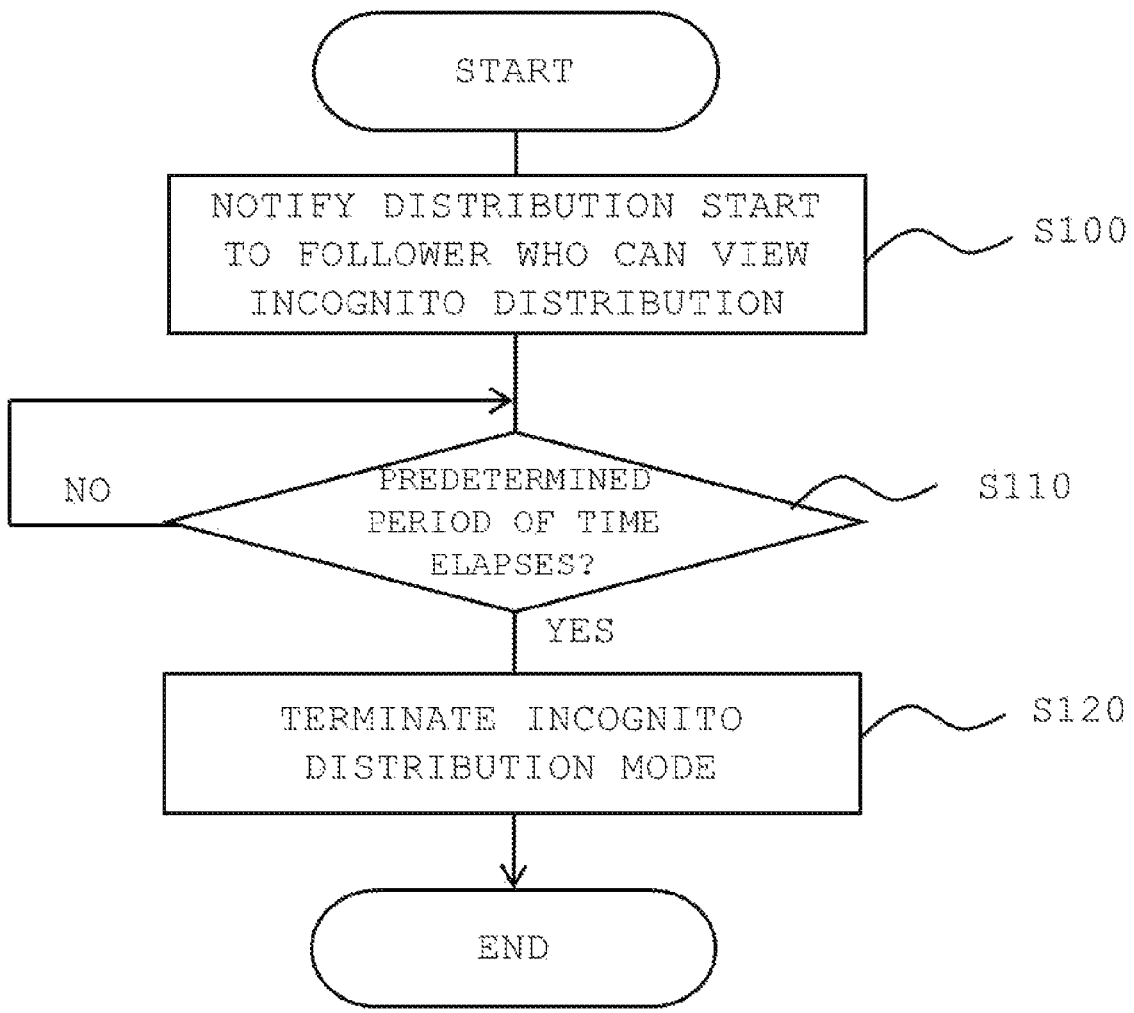
FIG. 12 is a flowchart illustrating processing executed by the video distribution server 10 in response to a start of incognito distribution.

Here, incognito distribution will be described. FIG. 12 is a flowchart illustrating processing executed by the video distribution server 10 in response to a start of the incognito distribution (in other words, when the distribution start button 106 on the screen 100 is selected while the "incognito distribution mode" is set through the incognito distribution setting switch 104 on the distribution preparation screen 100).

First, as illustrated, the server 10 notifies a distribution start to a follower who can view "incognito distribution" provided by a corresponding user (distributor) (step S100). Specifically, a notification (such as a push notification and a notification in application) about a distribution start is made to a user among followers (specified by referring to the follower information in the user information table 411) of a distributor except for a user restricted from viewing "incognito distribution" provided by the distributor (specified by referring to "incognito distribution viewing restriction flag" in the distributor-specific viewing management table 413). In this way, in a notification to a follower in response to a start of incognito distribution, a user restricted from viewing the incognito distribution is excluded.

Figure 13:
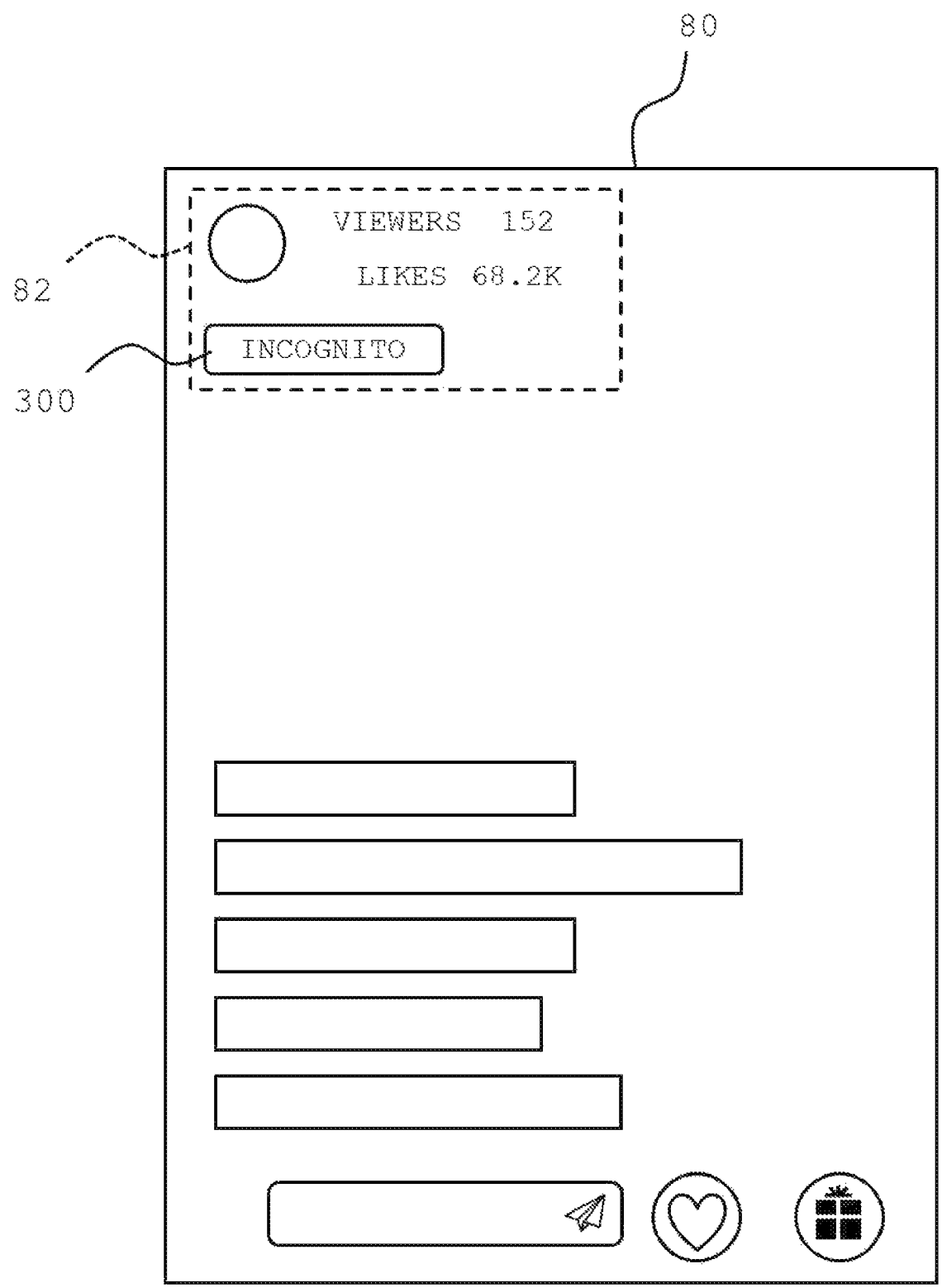
FIG. 13 is a diagram illustrating the viewing screen 80 when a distribution mode of live video is "incognito distribution mode".

FIG. 13 illustrates the viewing screen 80 when a distribution mode of live video is "incognito distribution mode". As illustrated, while the distribution mode is "incognito distribution mode" (specified by referring to "incognito distribution mode flag" in the distribution management table 412), an incognito distribution object 300 that displays "incognito" is displayed in the basic information display area 82. A viewer can recognize that live video being viewed by the viewer is "incognito distribution" through the object 300. Further, the incognito distribution object 300 is displayed in the basic information display area 72 on the distribution screen 70 as well. Note that, even in the individual display area 641 on the top screen 60, when corresponding live video is "incognito distribution", the same or similar object to the incognito distribution object 300 may be displayed.

The flowchart in FIG. 12 is referred back. Then, the server 10 waits until a predetermined period of time (for example, 60 minutes) elapses from the start of the incognito distribution (NO in step S110), and, when the predetermined period of time elapses (YES in step S110), the incognito distribution mode is terminated (step S120). Specifically, a value of "incognito distribution mode flag" in the distribution management table 412 is updated (a value corresponding to a normal mode that is not the incognito distribution mode is set). Further, the incognito distribution object 300 disappears (is non-displayed) in the basic information display areas 72 and 82 on the distribution screen 70 and the viewing screen 80 in response to a termination of the incognito distribution mode. Note that, when the incognito distribution mode is terminated and/or before a predetermined period of time of the termination, a predetermined message related to the termination of the incognito distribution mode may be displayed on the distribution screen 70 and/or the viewing screen 80.

Further, when the incognito distribution mode is terminated, live video being distributed also becomes a target to be displayed in a list on the top screen 60 for a user restricted from viewing "incognito distribution" provided by a corresponding distributor, and can be viewed by such a user. Note that a notification (such as a push notification and a notification in application) may be made for such a user in response to the termination of the incognito distribution mode.

Figure 14:
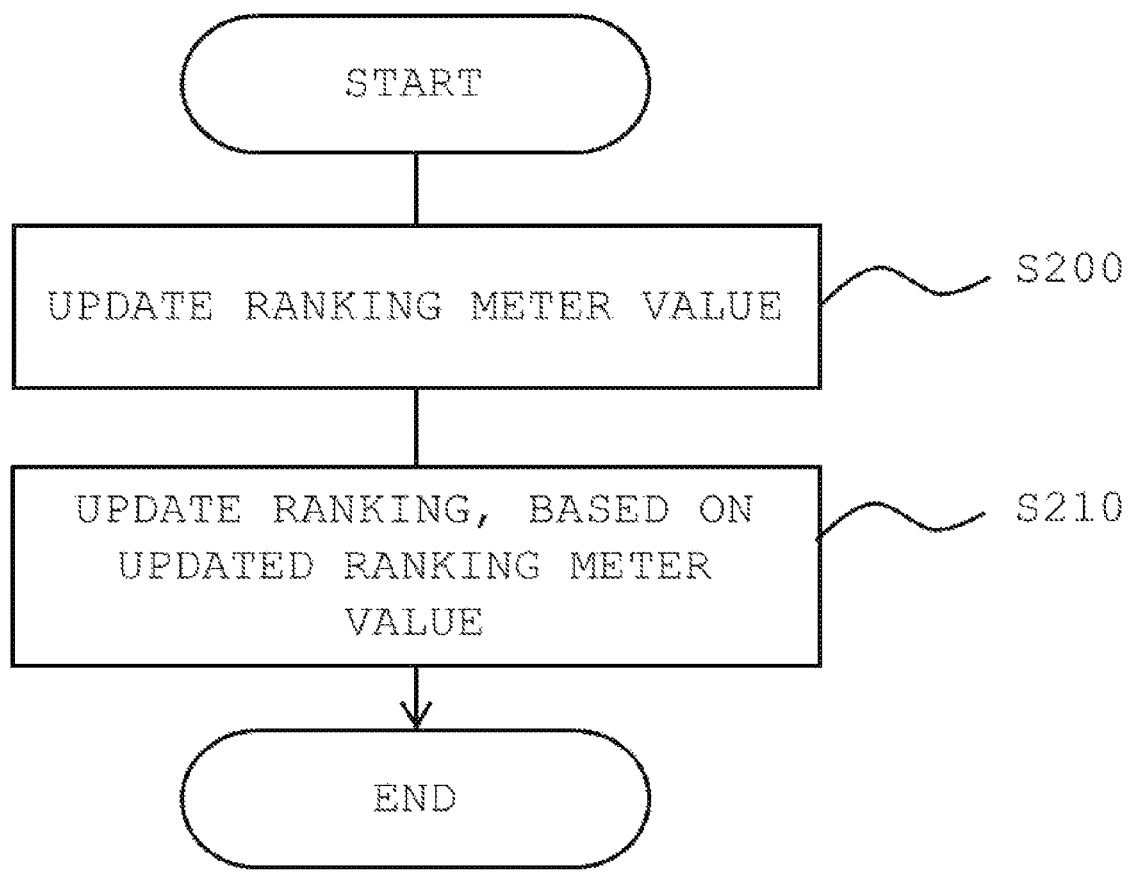
FIG. 14 is a flowchart illustrating processing executed by the video distribution server 10 when a ranking is updated.

The incognito distribution is described above. Next, updating of a ranking will be described. In this example, a ranking on the day is determined (updated) based on a distribution point acquired by a user on the previous day. FIG. 14 is a flowchart illustrating processing executed by the video distribution server 10 when a ranking of each user is updated. The processing is executed in the middle of every night (for example, 3 o'clock every morning).

First, as illustrated in FIG. 14, the server 10 updates a ranking meter value of each user (step S200). FIG. 15 is a diagram illustrating an update rule for a ranking meter value. As illustrated, in this example, a ranking meter value fluctuates based on a rating of a distribution point acquired by a user on the previous day within a ranking band to which the user belongs. The distribution point acquired by a specific user on the previous day is calculated by referring to the distributor user account, the distribution date and time, and the distribution point in the distribution management table 412. Note that, when the user performs distribution for a plurality of times in one day, a distribution point acquired in each of the plurality of times of the distribution is added together.

Specifically, as illustrated in FIG. 15, first, when a rating of a distribution point within a ranking band is included in the top 10%, a fluctuation in ranking meter value is "+2" (points increased by two) in an update rule for a ranking meter value. Similarly, a fluctuation when the rating is included in the top 11 to 30% (remaining 20% after subtracting the top 10% from the top 30%) is "+1", a fluctuation when the rating is included in the middle 30% (top 31 to 60%) is "±0" (no increase or decrease), and a fluctuation when the rating is included in the bottom 40% is "−1" (points decreased by one). Note that, when no distribution is performed on the previous day, a fluctuation in ranking meter value is "−1" regardless of the rating within the ranking band.

In step S200, a ranking meter value of each user is updated according to the update rule illustrated in FIG. 15. Note that, when a user has a ranking meter value that is negative and a fluctuation in ranking meter value this time is an increase (specifically, +2 or +1), the ranking meter value may be cleared to zero and then increased from there. In other words, for example, when a fluctuation this time of a user whose current value of the ranking meter value is "−1" is "+2", the ranking meter value is cleared to zero and then increased by two, and the ranking meter value after the fluctuation is "+2" (instead of "+1"). In this way, even when a user has a ranking meter value that is negative (for example, a user having low distribution frequency), the ranking meter value can be increased all at once, and thus distribution of live video is promoted.

When the flowchart in FIG. 14 is referred back, and the ranking meter value of each user is updated, the server 10 then updates a ranking, based on the updated ranking meter value (step S210). FIG. 16 is a diagram illustrating a correspondence relationship between an update content of a ranking and a necessary ranking meter value. As illustrated, first, a ranking meter value needed when a ranking increases to another ranking band (in other words, when the ranking increases from the highest ranking within each ranking band) is +4. In other words, a user belonging to the highest ranking (for example, A+) within each ranking band moves up in ranking to the lowest ranking (for example, S−) within a next higher ranking band when the ranking meter value becomes +4. Further, a ranking meter value needed when a ranking increases within the same ranking band (in other words, when the ranking increases from the middle or lowest ranking within each ranking band) is +2. In other words, a user belonging to the middle or lowest ranking (for example, B or B−) within each ranking band moves up in ranking to a next higher ranking (for example, B+ or B) within the same ranking band when the ranking meter value is +2.

Similarly, as illustrated in FIG. 16, a ranking meter value needed when a ranking decreases within the same ranking band (in other words, when the ranking decreases from the highest or middle ranking within each ranking band) is −2. In other words, a user belonging to the highest or middle ranking (for example, B+ or B) within each ranking band moves down in ranking to a next lower ranking (for example, B or B−) within the same ranking band when the ranking meter value is −2. Further, a ranking meter value needed when a ranking decreases to another ranking band is −6. In other words, a user belonging to the lowest ranking (for example, A−) within each ranking band moves down in ranking to the highest ranking (for example, B+) within a next lower ranking band when the ranking meter value is −6.

In this way, in this example, an increase and a decrease in ranking to another ranking band have a larger absolute value of the necessary ranking meter value than that of an increase and a decrease in ranking within the same ranking band. As a result, an abrupt increase and an abrupt decrease in ranking within a short period are suppressed.

Referring back to the flowchart in FIG. 14, in step S210, updating of a ranking is performed based on the ranking meter value according to the correspondence relationship illustrated in FIG. 16. Note that the ranking meter value of the user whose ranking has been updated (the user whose ranking has increased or decreased) is cleared to zero.

Figure 17:
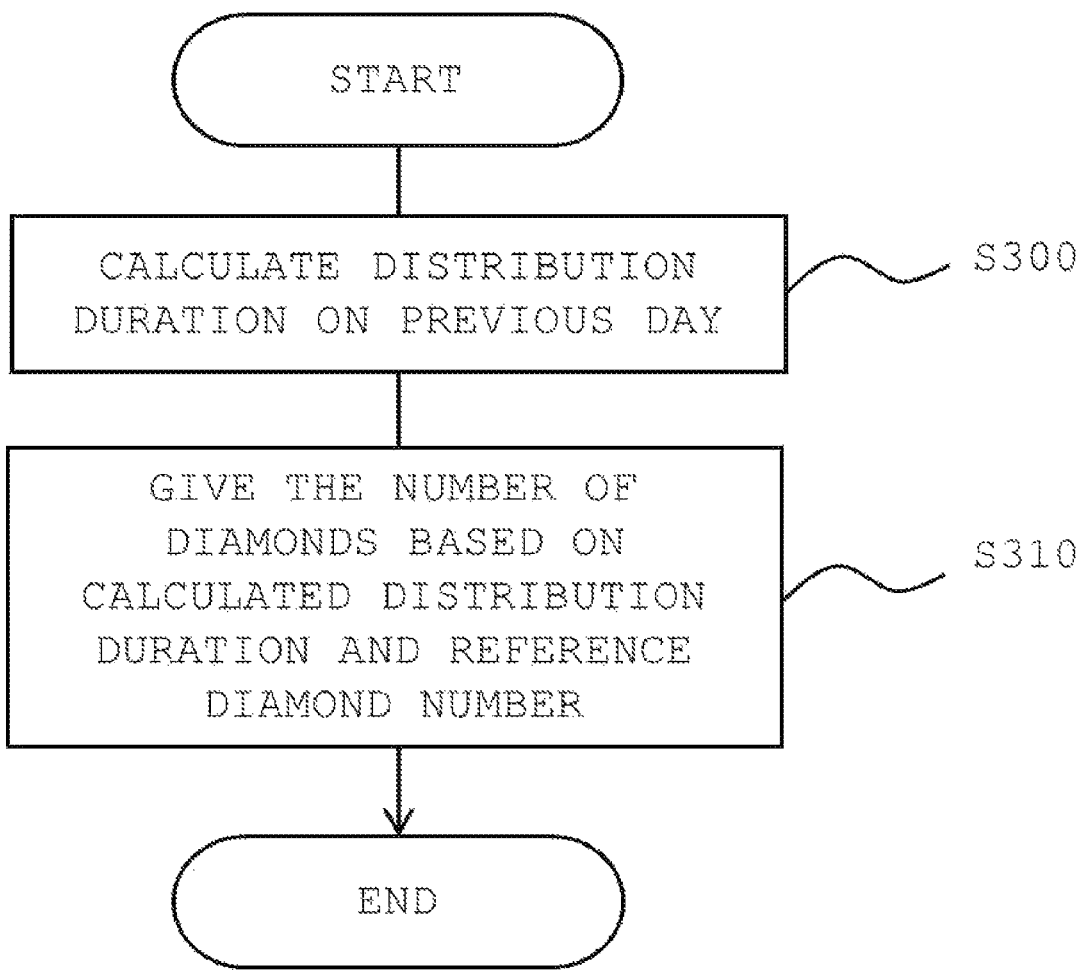
FIG. 17 is a flowchart illustrating processing executed by the video distribution server 10 when a virtual diamond is given.

Updating of a ranking is described above. Next, giving a diamond will be described. In this example, a virtual diamond that is a reward for a user as a distributor is given based on a distribution duration on a previous day and a ranking (a ranking on the previous day). FIG. 17 is a flowchart illustrating processing executed by the video distribution server 10 when a diamond is given to each distributor. The processing is executed in the middle of every night, and is, for example, executed at a time (for example, 0 o'clock every morning) before the processing executed when a ranking of each user is updated, which is illustrated in FIG. 14.

First, as illustrated, the server 10 calculates a distribution duration on a previous day of each user (step S300). Specifically, the distribution duration on the previous day of a specific user is specified by referring to the distributor user account, the distribution date and time, and the distribution duration in the distribution management table 412. When the user performs distribution for a plurality of times in one day, a distribution duration of each of the plurality of times of the distribution is added together.

Then, the server 10 gives, to each user, the number of diamonds based on the calculated distribution duration and a reference diamond number (step S310). Specifically, the number of diamonds acquired by multiplying the calculated distribution duration by the reference diamond number is given to each user. The reference diamond number is preset for each ranking so as to increase with a higher ranking, and a reference diamond number corresponding to a ranking on a previous day of each user is applied. When a diamond is given to the user, the number of held diamonds in the user information table 411 is updated. In this example, the diamond can be exchanged for a coin or real currency.

In the example described above, the incognito distribution is configured so as to be able to be viewed only by a viewer whose total of viewing time in a last month and a current month of live video provided by a corresponding distributor is less than a predetermined value. However, a "total of viewing time in a last month and a current month" is one example of a predetermined parameter for determining whether to enable (restrict from) viewing of the incognito distribution, and in another example of the present embodiment, another parameter (a total of viewing time in a different period, the number of times of viewing in a specific period, a viewing rate, or the like) that increases according to viewing may be applied.

In the example described above, a termination condition (a lapse of a predetermined period of time from a distribution start) of an incognito distribution mode may be changed according to a distribution situation of the incognito distribution. For example, as the number of viewers (current value or maximum value) of the incognito distribution, the number of comments, the number of likes, an item point, and the like increase, an elapsed time until the incognito distribution mode is terminated may be increased. Furthermore, as the termination condition of "incognito distribution mode", a condition other than an elapsed time from a distribution start can be applied. For example, the incognito distribution mode may continue while a value of a parameter indicating excitement of distribution such as an input frequency (speed) of comments and likes (the number of inputs of comments and "likes" per unit time) is equal to or more than a predetermined value, whereas the incognito distribution mode may be terminated when the value of the parameter is less than the predetermined value.

Further, some users restricted from viewing the incognito distribution (users who do not satisfy a condition related to a value of a predetermined parameter (such as a total of viewing time in a last month and a current month)) may be able to view the incognito distribution according to setting by a distributor. For example, on a screen such as the distribution preparation screen 100, a predetermined number of viewers or fewer may be able to be selected from among viewers restricted from viewing the incognito distribution, a notification of a start of the incognito distribution may be transmitted to the selected viewers, and the selected viewers may be able to view the distribution. When such a viewer is selected on the screen, a viewer registered in advance as a fan of a distributor (a member of a family) may be able to be selected. In this way, support for smooth progress of live distribution from a predetermined number of regular viewers or fewer selected by a distributor can be expected.

The video distribution server 10 according to the present embodiment described above distributes live video provided by a specific distributor such that a viewer having a smaller value of a predetermined parameter (for example, a total of viewing time in a last month and a current month, and the like) corresponding to the specific distributor (i.e., a viewer having a small number of times of viewing the live video provided by the specific distributor) is prioritized (for example, viewing by a user other than such a viewer is restricted, a distribution start is notified to only such a viewer, and the like). Thus, a new viewer is prioritized over a regular viewer of the live video provided by the specific distributor. As a result, viewing of the live video by the new viewer may be promoted.

The processing and procedures described in the specification may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, and a magnetic disk. Further, the processing and procedures described in the specification can be implemented as a computer program corresponding to the processing and procedures, and can be executed by various kinds of computers.

Although the processing and procedures described in the specification are described as being executed by a single device, a single piece of software, a single component, or a single module, such processing or procedures can be executed by a plurality of devices, a plurality of pieces of software, a plurality of components, and/or a plurality of modules. Further, the software and hardware elements described in the specification can also be realized by integrating them into fewer components, or breaking them down into more components.

In the specification, when a component of the invention is described as being either one or a plurality of things, or when it is described without any limitation as to number, the component may be either one or a plurality of things, except when the context indicates otherwise.

What is claimed is:

1. A system for distributing live videos comprising:
one or a plurality of computer processors, wherein
the one or plurality of computer processors execute a machine-readable instruction to perform:
distributing first live videos provided by a distributor to a plurality of viewers;
managing a value of a predetermined parameter associated with the distributor for each of the viewers, wherein
for each of the viewers, the predetermined parameter increases as one or both of viewing time and a number of times of viewing of the first live videos increases; and
distributing a second live video provided by the distributor such that a viewer, among the plurality of viewers, having a smaller value of the predetermined parameter is prioritized.

2. The system according to claim 1, wherein
the second live video is distributed to a viewer, among the plurality of viewers, having a value of the predetermined parameter being less than a predetermined value, but the second live video is not distributed to a viewer, among the plurality of viewers, having a value of the predetermined parameter being equal to or more than the predetermined value.

3. The system according to claim 1, wherein
the one or plurality of computer processors further:
notify a first viewer, among the plurality of viewers, of a start of distribution of the second live video; and
do not notify a second viewer, among the plurality of viewers, of the start of the distribution of the second live video,
the first viewer has a value of the predetermined parameter being less than a predetermined value, and
the second viewer has a value of the predetermined parameter being equal to or more than the predetermined value.

4. The system according to claim 1, wherein
the distribution of the second live video includes starting a predetermined mode that prioritizes a viewer having a smaller value of the predetermined parameter according to an instruction by the distributor, and subsequently terminating the predetermined mode according to sufficiency of a predetermined termination condition.

5. The system according to claim 4, wherein
the distribution of the second live video includes starting the predetermined mode in response to a start of distribution of the second live video, and subsequently terminating the predetermined mode according to a lapse of a predetermined period of time.

6. The system according to claim 4, wherein
the predetermined termination condition is configured to change according to a distribution situation of the second live video.

7. The system according to claim 6, wherein
the predetermined termination condition is configured to continue the predetermined mode as the number of viewers of the second live video increases.

8. The system according to claim 6, wherein
the predetermined termination condition is configured to continue the predetermined mode as the number of inputs of input information by a viewer of the second live video increases.

9. A method for distributing live video being executed by one or a plurality of computers, the method comprising:
distributing first live videos provided by a distributor to a plurality of viewers; and
managing a value of a predetermined parameter associated with the distributor for each of the viewers, wherein
for each of the viewers, the predetermined parameter increases as one or both of viewing time and a number of times of viewing of the first live videos increases; and
distributing a second live video provided by the distributor such that a viewer, among the plurality of viewers, having a smaller value of the predetermined parameter is prioritized.

10. A non-transitory computer-readable medium including a program for distributing live video, wherein the program causes one or a plurality of computers to execute:
distributing first live videos provided by a distributor to a plurality of viewers; and
managing a value of a predetermined parameter associated with the distributor for each of the viewers, wherein
for each of the viewers, the predetermined parameter increases as one or both of viewing time and a number of times of viewing of the first live videos increases; and
distributing a second live video provided by the distributor such that a viewer, among the plurality of viewers, having a smaller value of the predetermined parameter is prioritized.

* * * * *